United States Patent [19]
Kelsey

[11] Patent Number: 6,093,786
[45] Date of Patent: *Jul. 25, 2000

[54] PROCESS FOR PREPARING POLYTRIMETHYLENE TEREPHTHALATE

[75] Inventor: Donald Ross Kelsey, Fulshear, Tex.

[73] Assignee: Shell Oil Company, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/911,848

[22] Filed: Aug. 15, 1997

Related U.S. Application Data

[63] Continuation of application No. 08/757,197, Nov. 27, 1996.

[51] Int. Cl.[7] .................................................. C08G 63/02
[52] U.S. Cl. ...................... 528/271; 528/176; 528/193; 528/194; 528/272; 528/286; 528/287
[58] Field of Search .................................. 528/176, 193, 528/194, 271, 272, 286, 287

[56] References Cited

U.S. PATENT DOCUMENTS

| | | | |
|---|---|---|---|
| 2,465,319 | 3/1949 | Whinfield et al. | 528/271 |
| 3,386,952 | 6/1968 | Bath et al. | 260/45.95 |
| 3,642,868 | 2/1972 | Dexter | 260/473 |
| 3,644,482 | 2/1972 | Dexter et al. | 260/473 |
| 3,676,393 | 7/1972 | Piirma | 260/45.7 |
| 3,681,431 | 8/1972 | Dexter et al. | 260/473 |
| 3,821,169 | 6/1974 | Duddey | 260/77 |
| 3,951,915 | 4/1976 | Keck et al. | 528/271 |
| 3,985,705 | 10/1976 | Georgoudis | 260/45.8 |
| 3,987,004 | 10/1976 | Georgoudis | 260/45.8 |
| 4,011,196 | 3/1977 | Carevic et al. | 528/271 |
| 4,056,356 | 11/1977 | Gilkey et al. | 8/168 |
| 4,101,326 | 7/1978 | Barkey | 96/67 |
| 4,200,731 | 4/1980 | Massey et al. | 525/437 |
| 4,330,462 | 5/1982 | Keck et al. | 524/331 |
| 4,434,276 | 2/1984 | Horlbeck et al. | 525/437 |
| 4,548,975 | 10/1985 | Lewis | 524/147 |
| 4,910,286 | 3/1990 | White et al. | 528/272 |
| 5,138,024 | 8/1992 | Brozek et al. | 528/272 |

FOREIGN PATENT DOCUMENTS

| | | | |
|---|---|---|---|
| 0620245 A1 | 3/1994 | European Pat. Off. | C08J 5/18 |
| 51-024696 | 2/1976 | Japan | C08G 63/22 |
| 51-142097 | 7/1976 | Japan | C08G 63/22 |
| 52-009060 | 1/1977 | Japan | C08G 63/76 |
| 01282215 | 11/1989 | Japan | C08G 63/22 |
| 06329887 | 11/1994 | Japan | C08L 67/02 |
| 08120521 | 5/1996 | Japan | D01F 6/62 |
| 8-325391 | 10/1996 | Japan | C08J 5/18 |
| 08311177 | 11/1996 | Japan | C08G 63/183 |
| 1351247 | 4/1974 | United Kingdom | C08G 17/08 |

OTHER PUBLICATIONS

Weingart, F. et al., "Titanium catalyst in the manufacture of polyethylene terephthalate", *Chemical Fibers International* (CFI), vol. 46, Apr. 1996.

*Primary Examiner*—Terressa Mosley-Boykin

[57] ABSTRACT

Polytrimethylene terephthalate is prepared in a process which includes adding a hindered phenol and an aromatic organophosphite to the polymerization reaction mixture. The process generates a reduced level of acrolein and prepares an improved polyester product compared with processes without the phenol and organophosphite additives.

20 Claims, No Drawings

PROCESS FOR PREPARING POLYTRIMETHYLENE TEREPHTHALATE

This is a continuation of application Ser. No. 08/757,197 filed Nov. 27, 1926.

BACKGROUND OF THE INVENTION

This invention relates to the preparation of 1,3-propanediol-based polyesters. In one aspect, the invention relates to reducing the formation of by-products during the melt condensation polymerization phase of the preparation of polytrimethylene terephthalate. In a further aspect, the invention relates to the production of polytrimethylene terephthalate which has a reduced tendency to form acrolein when heated in air.

Polytrimethylene terephthalate is a polyester useful in fiber applications in the carpet and textile industries. The manufacture of high molecular weight polytrimethylene terephthalate involves the melt condensation polymerization of 1,3-propanediol and terephthalic acid (or an alkyl ester thereof) to a low molecular weight polyester, followed by solid-state polycondensation to produce a high molecular weight polyester. The 1,3-propanediol can be derived from either acrolein or ethylene oxide, but in each case the product 1,3-propanediol typically contains carbonyl-containing by-products in amounts from 50 ppm to more than 1000 ppm.

The inventor has found that, during the polymerization process, certain of such by-product carbonyls can be converted to acrolein, and their presence in the final product can adversely affect the color of the polymer. Furthermore, when polytrimethylene terephthalate is heated in air at temperatures greater than about 100° C., such as when the polymer is being dried or prior to solid-stating, acrolein is slowly formed. It would be desirable to produce polytrimethylene terephthalate and other 1,3-propanediol-based polyesters in a process which reduced the formation of acrolein and other carbonyl impurities both during polymerization and during heating of the finished polymer in air.

It is therefore an object of the invention to reduce the production of carbonyl-containing byproducts including acrolein during the preparation of 1,3-propanediol-based polyesters. It is a further object of the invention to reduce the tendency of 1,3-propanediol-based polyesters such as polytrimethylene terephthalate to generate acrolein when heated in air.

SUMMARY OF THE INVENTION

According to the invention, a 1,3-propanediol-based aromatic polyester is prepared in a process comprising the steps of:

(a) preparing a condensation polymerization reaction mixture comprising (i) 1,3-propanediol, (ii) an aromatic acid or a dialkyl ester thereof, (iii) an aromatic organophosphite containing a trivalent phosphorus group of the formula $(ArO)_wP$ in which Ar is an aryl group and w is an integer from 1 to 3; and (iv) a hindered phenol of the formula

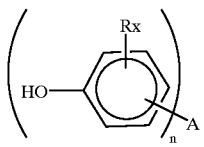

in which each R is a $C_{1-30}$ alkyl group including methyl, ethyl, isopropyl, 2-phenyl-2-propyl, t-butyl and t-amyl and the like; x is an integer from 1 to 4; at least one R is ortho to the phenolic hydroxyl group; A is a $C_{5-50}$ hydrocarbyl group optionally including heteroatoms such as boron, nitrogen, oxygen, fluorine, silicon, phosphorous and sulfur; and n is an integer from 1 to about 4; and (b) maintaining the polymerization reaction mixture under condensation polymerization conditions for a time sufficient to form a polyester composition having an intrinsic viscosity of at least about 0.8.

The addition of the combination of an organophosphite and a hindered phenol permits the production of a 1,3-propanediol-based polyester such as polytrimethylene terephthalate with a lower level of carbonyl by-products as well as a reduced tendency in the polyester to generate acrolein when heated in air. In many cases, the color of the polytrimethylene terephthalate is also improved.

DETAILED DESCRIPTION OF THE INVENTION

As used herein, "carbonyls" refers to those compounds, whether containing the C=O chemical group or not, converted according to ASTM E 411-70 to 2,4-nitrophenylhydrazone derivatives and measured calorimetrically. Such carbonyls are derived from both acetals and free carbonyls (e.g., aldehydes and ketones) and are referred to herein in ppm based on C=O.

As used herein, "1,3-propanediol-based aromatic polyester" refers to a polyester prepared by reacting at least one diol with at least one aromatic diacid (or alkyl ester thereof) in which at least 50 mole percent of the diol is 1,3-propanediol. "Polytrimethylene terephthalate" ("PTT") refers to such a polyester in which at least 50 mole percent of the diacid is terephthalic acid (or an alkyl ester thereof). Other diols may include, for example, ethylene glycol, bis(3-hydroxypropyl)ether and 1,4-butanediol, and other diacids may include, for example, isophthalic acid and 2,6-naphthalene dicarboxylic acid. The condensation polymerization of polytrimethylene terephthalate usually generates as much as about 4 mole percent of bis(3-hydroxypropyl)ether which, in effect, becomes a comonomer and is incorporated into the polyester chain.

The hindered phenol additive is selected from compounds of the general formula

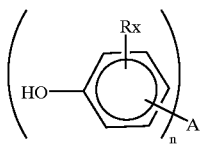

in which each R is selected independently from $C_{1-30}$ alkyl groups including methyl, ethyl, isopropyl, t-butyl, t-amyl, 2-phenyl-2-propyl, and the like; x is an integer from 1 to 4; at least one R group is ortho to the phenolic hydroxyl; A is a $C_{5-50}$ hydrocarbyl or heterocarbyl group (a predominantly hydrocarbon group which includes at least one heteroatom such as boron, nitrogen, oxygen, fluorine, silicon, phosphorus and sulfur); and n is an integer from 1 to about 4.

A preferred class of hindered phenols is

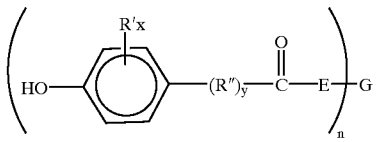

in which each R' is slected independently from $C_{1-12}$ alkyl; x is 1 or 2; R" —$(CH_2)$— or alkyl-substituted methylene; y is an integer from 1 to about 20; E is oxygen or nitrogen; and G is a direct bond, hydrogen or $C_{1-30}$ mono-, di-, tri- or tetravalent linear or branched hydrocarbyl or heterocarbyl. Examples of G include R', —$(CH_2)_m$—, —$[(CH_2)_mO]_z$ $(CH_2)_m$—,

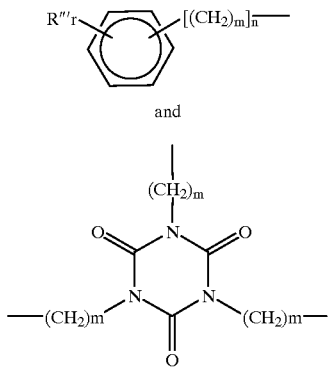

in which R'" is $C_{1-20}$ linear or branched hydrocarbyl; each m is independently an integer from 2 to about 12; r is an integer from 0 to 5; and z is an integer from 1 to about 10. Specific examples of such hindered phenols include octadecyl 1,3-(3,5-di-t-butyl-4-hydroxyphenyl)propionate, 1,6-hexamethylene bis(3-(3,5-di-t-butyl-4-hydroxy-phenyl) propionate), 1,2-bis(3-(3,5-di-t-butyl-4-hydroxyphenyl) propanol)hydrazine, 1,3,5-tris(3,5-di-t-butyl-4-hydroxybenzyl)-1,3,5-triazine-2,4,6(1H,3H,5H)-trione, tetrakis(methylene (3(3,5-di-t-butyl-4-hydroxy-phenyl) propionate)]methane, triethyleneglycol bis (3-(3-t-butyl-4-hydroxy-5-methylphenyl)propionate) and N,N'-hexamethylene bis(3-(3,5-di-t-butyl-4-hydroxyphenyl) propionamide, available commercially as Irganox 1076, Irganox 259, Irganox 1024, Irganox 3114, Irganox 1010, Irganox 245 and Irganox 1098, respectively.

The amount of hindered phenol will generally be such that the molar ratio of the hindered phenol to aromatic diacid monomer (or ester) present in the polymerization reaction mixture is from about 0.0005 mmole per mole of diacid to about 5 mmole/mole, preferably from about 0.005 to about 0.5 mmole/mole. Additional hindered phenolic acid/ester can be used but is not preferred because of limiting effects on final polyester molecular weight.

Although certain hindered phenols can increase polytrimethylene terephthalate color or reduce polymer molecular weight, the hindered phenols of the preferred group (E=oxygen) cause little or no increase in color. When used in combination with the organophosphites, which tend to decrease polymer color, the effect of the hindered phenol on color is often minimal.

Numerous processes are known to prepare polyesters. Such processes may be batch or continuous and employ one or multiple stages. In general, such processes have in common the reaction at elevated temperature of a diol (e.g., 1,3-propanediol) and an aromatic diacid or alkyl ester thereof, with removal of byproduct water or alcohol, for a time effective to produce a polyester having an intrinsic viscosity as measured in hexafluoroisopropanol of at least about 0.8.

In one embodiment of the invention process, a 1,3-propanediol-based polyester such as polytrimethylene terephthalate is prepared in a two-stage condensation polymerization process. The first stage, melt polycondensation, includes two steps, a "pressure step" followed by a "vacuum step." In the pressure step, a molar excess of at least one diol is reacted with at least one diacid (or alkyl ester thereof), usually in the absence of added catalyst in the case of diacid reactions, at a temperature within the range of about 230 to about 300° C., preferably about 240 to about 270° C., under elevated pressure, preferably under nitrogen gas, within the range of about 20 to about 200 psi, preferably about 50 psi. Water is produced as a byproduct and is removed by suitable means such as overhead distillation. The polymerization conditions are selected so as to produce a relatively low molecular weight polyester having an intrinsic viscosity (i.v.) as measured in hexafluoroisopropanol of less than about 0.3, usually within the range of about 0.05 to about 0.25.

The organophosphite is preferably added in this pressure step of the melt stage of the polymerization process. It has been found that addition of the organophosphite at this point, rather than in the subsequent steps or compounded in the melt with the finished polymer, results in greater retention of the phosphorus compound in the final polymer and superior retention of the property advantages imparted by the organophosphite. It has also been observed that the acrolein content of the aqueous distillate stream of the pressure step is reduced by the presence of the organophosphite in the reaction mixture of this step.

The aromatic organophosphite additive is one which includes the trivalent phosphorus group$(ArO)_wP$, in which Ar is a $C_{6-20}$ aromatic group and w is an integer from 1 to about 3. The preferred organophosphite additives are selected from aromatic organophosphites of the general formulas I–V:

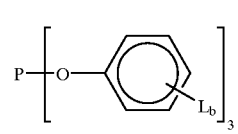

I

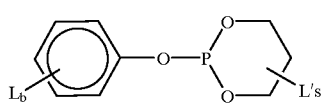

II

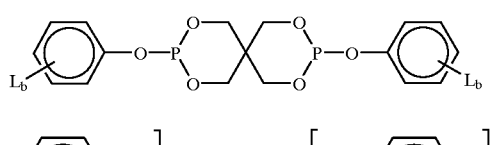

III

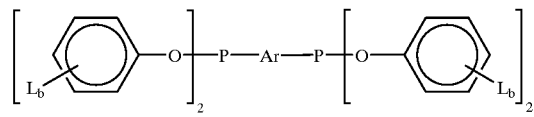

IV

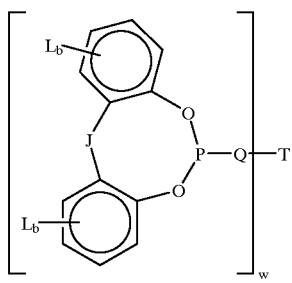

in which each L and L' is selected independently from $C_{1-20}$ hydrocarbyl and heterocarbyl; b is an integer from 1 to 3; s is an integer from 0 to 6; Ar is a $C_{6-20}$ substituted or unsubstituted aromatic group; J is a direct bond or divalent linking group such as —$CH_2$—, —CHR'—, —S—, —SO—, —$SO_2$—, —PO(OR')—, —$PO_2$—, —PR'—, —CO—, and the like where R' is $C_{1-20}$ hydrocarbyl, Q is fluorine or a divalent linking group such as —Ar—, —O—, alkylidene such as —$CH_2$—, and —$CH_2CH_2$—, and the like; T is hydrogen or a $C_{1-20}$ hydrocarbyl or heterocarbyl group; and w is an integer from 1 to 3. Examples of preferred organophosphites are tris(2,4-di-t-butylphenyl)phosphite, bis(2,4-di-t-butylphenyl)pentaerythritol diphosphite and 2-[[2,4,8,10-tetrakis(1,1-dimethylethyl)dibenzo[d,f][1,3,2]-dioxaphosphepin-6-yl]oxy]-N,N-bis[2-[[2,4,8,10-tetrakis(1,1-dimethylethyl)dibenzo[d,f][1,3,2]dioxaphosphepin-6-yl]oxy]-ethyl]ethanamine, available commercially as Irgafos 168, Ultranox 626 and Irgafos 12, respectively.

The organophosphite compound is present in the condensation reaction mixture in an amount within the range of about 0.01 to about 0.5% wt, preferably about 0.05 to about 0.3% wt, based on the combined weight of the diol(s) and the diacid(s). Although higher amounts of phosphorus are desirable to achieve maximum reduction in by-products in the distillate streams, higher amounts can increase polymer color or vacuum step reaction times. To prevent such effects, the molar equivalents of phosphorus compared to equivalents of titanium or tin in the preferred polymerization catalyst should be kept below about 5, preferably below about 2, most preferably below about 1.

For the vacuum step of the melt polycondensation stage, the pressure on the reaction mixture is reduced and a catalyst is added. The preferred polycondensation catalysts are compounds of titanium or tin, such as titanium butoxide, present in an amount within the range of about 10 to about 400 ppm titanium or tin, based on the weight of the polymer. The low molecular weight product of the first step is heated at a temperature within the range of about 240 to about 300° C. under less than atmospheric pressure for a time effective to increase the intrinsic viscosity of the starting material to at least about 0.5. During the reaction, additional water is produced as a by-product and is removed overhead along with the excess diol. It has been observed that the carbonyl content of this second-step distillate is also reduced by the addition of the organophosphite to the pressure step of the melt polymerization.

The hindered phenol can be added to the pressure step of the polymerization process, to the vacuum step, or to the polymer melt prior to solid-stating. Addition to the vacuum step has the advantage of producing polymer which is, in general, lower in color than if the hindered phenol is added to the pressure step. In a preferred embodiment for minimum acrolein generation and greatest convenience, the organophosphite and the hindered phenol are added to the reaction mixture of the pressure step of melt polycondensation.

The molten product of the melt stage is cooled, solidified and optionally formed into pellets. The polymer is then polycondensed in solid form ("solid-stated") at an elevated temperature less than the target polymer melt point, generally (for polytrimethylene terephthalate) a temperature greater than about 180° C., preferably above about 200° C., under reduced pressure and/or an inert gas stream. The solid-stating phase is carried out for a time, generally about 4 hours or more, to produce a polyester having an intrinsic viscosity of at least about 0.8, generally within the range of about 0.95 to about 1.15 for fiber applications.

The polymer prepared according to the invention process is white or near-white in color. The process is characterized by lower production of acrolein and other carbonyl byproducts during the polymerization, and/or by the preparation of a 1,3-propanediol-based aromatic polyester such as polytrimethylene terephthalate which is less likely to generate acrolein when heated in air. The polymer can be spun into fibers or molded into parts which also have a reduced tendency to generate acrolein when heated in air.

EXAMPLE 1

Preparation of PTT.

This comparative experiment was performed using a 600 ml stainless steel pressure reactor fitted with a distillation column, condenser and collection vessel. The reactor was charged with 133.2 g (1.75 mole) of 1,3-propanediol having a carbonyl number of about 45 ppm and 207.7 g (1.25 mole) terephthalic acid. The reactor was pressurized to 50–80 psi with nitrogen, with pressure released five times to degas followed by repressurization to 20 psi and heating to 250° C. The pressure was maintained at 50 psi for two hours and then lowered in 10-psi increments each hour thereafter. After a total of about 6 hours, any remaining pressure was released and the aqueous distillate was weighed. The molten product was poured into a pan and cooled.

The product oligomer (140 g) and 0.09 g titanium butoxide (100 ppm based on Ti) were charged to a 500-mL 3-neck flask. The flask was degassed with nitrogen, evacuated to about 200 mbar with a small nitrogen sweep through the reactor, and heated with stirring in an oil bath to 260° C. The pressure was reduced to less than about 2 mbar. After 3 hours, the reaction mixture was cooled and the polymer was isolated.

Intrinsic viscosity (i.v.) of the polymer was measured in hexafluoroisopropanol. The yellowness index (YI) of the polymer was measured on a molded plaque by reflectance in accordance with ASTM D-1925. YI of the oligomer was measured on a sample collected in a small aluminum cup. Results are shown in Table 1 as Run 1.

EXAMPLE 2

Preparation of PTT with Phosphite Additive.

The polymerization of Example 1 was repeated, except that 0.34 g (0.1 wt %) of bis(2,4-di-t-butylphenyl) pentaerythritol diphosphite (designated "C-1" in Table 1) was added to the first reactor with the 1,3-propanediol and terephthalic acid. Test results are shown in Table 1 as Run 2.

EXAMPLE 3

Preparation of PTT with Phosphite Additive.

The polymerization of Example 2 was repeated, except that twice as much (0.18 g) titanium butoxide catalyst was used. Results are shown in Table 1 as Run 3.

EXAMPLE 4
Preparation of PTT with Phosphite Additive.

The polymerization of Example 1 was repeated, except that 0.34 g of phosphite E-1 was added to the first reactor with the 1,3-propanediol and terephthalic acid. Results are shown in Table 1 as Run 4.

EXAMPLE 5
Preparation of PTT with Phosphite Additive.

The polymerization of Example 1 was repeated, except that the 1,3-propanediol had a carbonyl number of 120 ppm and 0.34 g of phosphite D-1 was added to the monomer mixture. Results are shown in Table 1 as Run 5.

EXAMPLE 6
Preparation of PTT.

This comparative experiment was performed as described in Example 1, except that 1,3-propanediol having a carbonyl number of about 590 ppm was used. Results are shown in Table 1 as Run 6.

EXAMPLE 7
Preparation of PTT with Various Phosphite Additives.

Polymerizations were conducted as described in Example 6, except that the indicated phosphite compounds were added to the first reactor with the 1,3-propanediol and terephthalic acid. Results are shown in Table 1 as Runs 7–13.

EXAMPLE 8
Preparation of PTT.

This comparative experiment was performed as described in Example 1, except that 1,3-propanediol having a carbonyl number of about 330 ppm and 80 ppm (based on titanium) titanium butoxide catalyst were used. Results are shown in Table 1 as run 14.

EXAMPLE 9
Preparation of PTT with Various Phosphite Additives.

Polymerizations were conducted as described in Example 8, except that the indicated phosphite compounds were added to the reaction mixture with the 1,3-propanediol and terephthalic acid. Results are shown in Table 1 as Runs 15–17.

EXAMPLE 10
Preparation of PTT with Phosphite Added to the Vacuum Step.

Vacuum condensation polymerizations were conducted using the oligomer prepared in comparative Example 8. Organophosphite E-1 was added to the second (vacuum) step rather than with the monomers in the first (pressure) step. A powdery substance was collected in the distillate. Analysis of the distillate showed that it contained 334 ppm phosphorus, while analysis of the polymer product itself found only 4 ppm phosphorus. Results are shown in Table 1 as Run 18.

Analysis of the polymer products of Runs 15, 16 and 17, in which the phosphite was added in the first step of polymerization, found 18 ppm, 28 ppm and 30 ppm phosphorus, respectively, in the polymer. This experiment demonstrates the effects of addition of the phosphite at different steps of polymerization with respect to incorporation of the phosphite into the polymer.

As can be seen from Table 1, the yellowness index of the polymers of Runs 2–5, prepared using 1,3-propanediol having the lowest carbonyl number, have higher yellowness index values than the polymer prepared without a phosphite additive. However, many of these same organophosphites are associated with lower yellowness as compared to the comparative polymers prepared from 1,3-propanediol having higher carbonyl numbers; e.g., Runs 7, 8 ,9, 12, 15 and 16 and additional experiments described below. Apparently, the organophosphite is relatively more effective in reducing yellowness in the polymer prepared from less pure 1,3-propanediol.

The i.v. results shown in Table 1 show that the organophosphite can result in a lower molecular weight in the polymer, although most of these polyesters achieved sufficient molecular weight for commercial application.

TABLE 1

| Run | Additive Type | wt %* | Oligomer (press. step) YI | Polymer (vac. step) IV | YI |
|---|---|---|---|---|---|
| 1 | none | | 6.0 | 1.24 | 19.8 |
| 2 | C-1 | 0.1 | 6.7 | 0.65 | 27.8 |
| 3 | C-1 | 0.1 | 6.7 | 0.68 | 28.2 |
| 4 | E-1 | 0.1 | 12.5 | 1.15 | 23.0 |
| 5 | D-1 | 0.1 | 2.9 | 0.99 | 27.7 |
| 6 | none | | 14.1 | 1.03 | 29.6 |
| 7 | E-1 | 0.1 | 7.4 | 1.05 | 18.4 |
| 8 | D-1 | 0.05 | 4.4 | 1.06 | 19.7 |
| 9 | D-1 | 0.1 | 8.0 | 0.88 | 26.8 |
| 10 | A-1 | 0.1 | 8.8 | 1.21 | 33.7 |
| 11 | A-2 | 0.1 | 7.6 | 1.02 | 33.0 |
| 12 | C-2 | 0.1 | 5.9 | 0.86 | 22.8 |
| 13 | E-2 | 0.1 | 16.7 | 0.54 | 30.6 |
| 14 | none | | 11.2 | 1.37 | 36.8 |
| 15 | A-1 | 0.15 | 6.5 | 1.08 | 27.1 |
| 16 | A-1 | 0.2 | 12.7 | 0.98 | 24.2 |
| 17 | B-1 | 0.1 | 9.9 | 0.66 | 41.0 |
| 18 | E-1 | 0.1 | | 1.15 | 43.0 |

*Based on weight of total charge to reactor
A-1 = tris(2,4-di-t-butylphenyl)phosphite
A-2 = tris (4-nonylphenyl)phosphite
B-1 = 5-butyl-5-ethyl-2-(2,4,6-tri-t-butylphenoxy)-1,3,2-dioxaphosphorinane
C-1 = bis(2,4-di-t-butylphenyl)peritaerythritol diphosphite
C-2 = bis(2,6-di-t-butyl-4-methylphenyl)pentaerythritol diphosphite
D-1 = reaction product of phosphorus trichloride with 1,1'-biphenyl and 2,4-di-t-butylphenol
E-1 = 2-[[2,4,8,10-tetrakis(1,1-dimethylethyl)dibenzo[d,f][,3,2]dioxaphosphepin-6-yl]oxy]-N,N-bis[2-[[2,4,8,10-tetrakis (1,1-dimethylethyl) dibenzo[d,f][1,3,2]dioxaphosphepin-6-yl]-ethyl]ethanamine
E-2 = 2,2'-ethylidene bis(4,6-di-t-butylphenyl) fluorophosphonite

EXAMPLE 11
Preparation of PTT with Phosphite Additives.

To an oil-heated stainless steel reactor were charged 11.5 lbs of 1,3-propanediol, 19.3 lbs terephthalic acid and the organophosphite indicated in Table 2. The mixture was heated to about 250° C. under 10 to 60 psi nitrogen, and the aqueous distillate was removed over about 4 hours. To the oligomeric product were added 9.6 lbs 1,3-propanediol and 16.1 lbs terephthalic acid. The reaction was continued under similar conditions for less than about 3 hours to produce an oligomer having an average degree of polymerization of about 4 to 8. Approximately half of the oligomer was transferred to a second reactor.

For subsequent batches, 1,3-propanediol (9.6 lbs) and terephthalic acid (16.1 lbs) were added to the oligomer remaining in the first reactor and the oligomerization was repeated. Titanium catalyst [Ti(OBu)$_4$] was added as a solution in PDO/HOAc to the second reactor, the reaction mixture was heated at about 250° C. under vacuum to less than about 2 mm Hg, and the PDO distillate was removed over about 1–2 hours at full vacuum until the desired molecular weight polyester (i.v. about 0.8) was achieved.

The molten polymer was discharged from the reactor as strands, cooled and pelletized (18–22 lbs product). The carbonyl impurities in the PDO distillate and the color (b*) of the polymer are given in Table 2. Values are averages of two or three batches. The Hunter b* color was measured by reflectance on pellets using a Hunter LabScan Spectrocolorimeter.

As can be seen from Table 2, organophosphites E-1, A-1, A-2 and C-1 generally lowered in the level of carbonyl impurities in the vacuum-step PDO distillate; Runs with A-1, C-1 and A-2 produced decreases in pellet color compared to control polymerizations run in the absence of phosphites. Triethylphosphite (Run 16) did not affect carbonyl levels in the distillate and did not decrease pellet color.

in the polymer (measured under nitrogen) and the phosphorus content of the polymer are shown in Table 3. Polymers were advanced to higher molecular weight (i.v. about 1.06) by solid-state polymerization at greater than about 200° C. under nitrogen flow for about 4–6 hours or more. Polymer acrolein level was measured by headspace GC on pellets at 175° C. in air after 6 hours (ppm based on polymer weight). The b* and carbonyl data are averages of 2–3 batches under a given set of reaction conditions. Acrolein and phosphorus were measured for a typical batch under the reaction conditions.

TABLE 3

| Run | A-1 (ppm P) | Step | Cat (ppm Ti) | PDO C=O | b* | PDO Distillate C=O (ppm) | Acrolein[a] (in $N_2$) (ppm) | Acrolein[b] (in air) (ppm) | P in pellets (ppm P) |
|---|---|---|---|---|---|---|---|---|---|
| 1 | none |  | 60 | low | 23.2 | 1038 | 61 | 39 | <2 |
| 2 | 50 | press | 40 | low | 17.8 | 910 | 18 | 68 | 23 |
| 3 | 50 | vac | 40 | high | 23.0 | 1236 | 45 | 36 | 5 |
| 4 | 75 | press | 40 | high | 18.6 | 622 | 22 | NM | 23 |
| 5 | 75 | vac | 40 | low | 20.2 | 728 | 52 | 51 | 6 |
| 6 | 50 | press | 80 | high | 23.6 | 652 | 48 | 57 | 18 |
| 7 | 50 | vac | 80 | low | 20.3 | 778 | 55 | 32 | 6 |
| 8 | 75 | press | 80 | low | 20.1 | 695 | 35 | 63 | 26 |
| 9 | 75 | vac | 80 | high | 22.6 | 622 | 51 | 40 | 11 |

[a]Measured by headspace GC on polymer from vacuum stage.
[b]Measured on polymer advanced to higher Mw by solid-state polymerization; acrolein initially in these samples(by headspace GC under $N_2$) averaged 7 ppm.
NM = not measured.

TABLE 2

| Run | Additive | (ppm P) | PDO Distillate ppm C = O | (% change) | b* |
|---|---|---|---|---|---|
| 1 | none |  | 1270 |  | 21.4 |
| 2 | E-1 | 30 | 820 | (−35) | 22.3 |
| 3 | E-1 | 50 | 800 | (−37) | 21.0 |
| 4 | none |  | 1010 |  | 22.1 |
| 5 | D-1 | 30 | 1630 | (+61) | 23.4 |
| 6 | D-1 | 50 | 1040 | (+3) | 21.9 |
| 7 | A-2 | 30 | 1120 | (+11) | 20.0 |
| 8 | A-2 | 50 | 920 | (−9) | 20.9 |
| 9 | none |  | 1240 |  | 22.3 |
| 10 | A-1 | 30 | 1000 | (−19) | 19.5 |
| 11 | A-1 | 50 | 850 | (−31) | 19.7 |
| 12 | none |  | 1090 |  | 21.6 |
| 13 | C-1 | 30 | 1050 | (−4) | 21.4 |
| 14 | C-1 | 50 | 920 | (−16) | 19.5 |
| 15 | none |  | 960 |  | 21.4 |
| 16 | TEP* | 20 | 930 | (−3) | 22.0 |

*TEP - triethylphosphite

EXAMPLE 12
Solid-State Polymerization of PTT Prepared with Phosphite Additive.

Polymerizations were carried out as described above for Example 11 using 50 or 75 ppm (as P) organophosphite A-1 added to the reaction in either the first (pressure) or second (vacuum) step, using either 40 or 80 ppm (as Ti) titanium tetrabutoxide catalyst, and using 1,3-propanediol having two different levels of carbonyl impurities. Three to five or more batches were prepared for each set of reaction conditions.

The b* color of the pellets from the reactor (at i.v. about 0.8), carbonyl levels in vacuum-step PDO distillate, acrolein

TABLE 4

Averaged Data for Example 12

|  | A-1 addition point | | A-1 charged | |
|---|---|---|---|---|
|  | pressure (1st) | vacuum (2nd) | 50 ppm | 75 ppm |
| Phosphorous (ppm) in pellets | 22 | 7 | 13 | 16 |
| Pellet color (b*) | 20.0 | 21.5 | 21.2 | 20.4 |
| Carbonyls in PDO distillate (ppm C = O) | 720 | 840 | 890 | 660 |
| Acrolein (ppm) in pellets @ 150° C. in nitrogen | 31 | 51 | 42 | 40 |
| Acrolein (ppm) from pellets @ 175° C. in air | 63 | 40 | 48 | 51 |

The results (summarized in Table 4) show that, on average, significantly more of the organophosphite additive was retained in the polymer when it was added in the first (pressure) step rather than in the second (vacuum) step. The pellet color and the by-products (C=O) in the PDO distillate and in the pellets before they were advanced to a higher molecular weight were lower when the additive was added in the pressure step rather than in the vacuum step. Color and by-products in the distillate were also lower, on average, when the higher additive level was used compared to the lower additive level. Note that the acrolein generated from pellets under air was not reduced by the presence of the organophosphite. However, the phosphite did appear to reduce the acrolein found in pellets before the solid-state polymerization stage when measured under nitrogen, particularly when the stabilizer was added in the pressure step.

EXAMPLE 13
Preparation of PTT (Comparative).

A 600 ml stainless-steel pressure reactor filled with a distillation column, condenser and collection vessel was charged with 133.2 g of 1,3-propanediol (1.75 mole) having a carbonyl number of about 100 ppm, and 207.7 g terephthalic acid (1.25 mole). The reactor was pressurized to 50–80 psi with nitrogen and the pressure was released five times to degas, then repressurized to 20 psi and heated to 250° C. For the first 2 hours the pressure was maintained near 50 psi, after which the pressure was lowered in 10 psi increments each hour thereafter. After a total of about 6 hours, any pressure was released and the aqueous distillate was weighed. The molten oligomer was poured into a pan and cooled. Yellowness index of the oligomer is shown in Table 5 (Run 1).

EXAMPLE 14
Preparation of PTT with Phenol Additive.

A polymerization was conducted as in Example 13, except that HP-6 (see Table 5) was added to the condensation reaction mixture. Yellowness index is shown in Table 5 as Run 2.

EXAMPLE 15
Preparation of PTT with Phosphite and Phenol Additives.

A polymerization was conducted as in Example 13, except that hindered phenol HP-6 and organophosphite C-1 were added to the condensation reaction. Yellowness index is shown in Table 5 as Run 3.

EXAMPLE 16
Preparation of PTT.

A series of polymerizations was conducted as described in Example 13, using 1,3-propanediol having a carbonyl number of about 45 ppm. The product oligomer (140 g) and 0.09 g titanium butoxide [Ti(OBu)$_4$; 100 ppm based on Ti] were charged to a 500 mL 3-neck flask. The flask was degassed with nitrogen, evacuated to about 200 mbar with a small nitrogen sweep, heated in an oil bath to 260° C., and stirred at about 20 rpm while pressure was reduced to less than about 2 mbar. After 3 hours, the reaction mixture was cooled and the polymer was isolated.

Intrinsic viscosity (i.v.) was measured in hexafluoroisopropanol. The yellowness index (YI) of the polymer was measured on a molded plaque by reflectance with a Gardner Colorgard system 105 according to ASTM D-1925. YI of the oligomer was measured on a sample collected in a small aluminum cup. Results are shown in Table 5 as Runs 4–6.

EXAMPLE 17
Preparation of PTT.

Polymerizations were conducted as in Example 16, except that propanediol having a carbonyl number of 590 ppm was used. Results are shown in Table 5 as Runs 7–10.

EXAMPLE 18
Preparation of PTT with Hindered Phenol and Various Phosphite Additives.

Polymerizations were conducted as described in Example 16 using 1,3-propanediol having a carbonyl number of about 330 ppm and 80 ppm (based on Ti) of Ti(OBu)$_4$ catalyst. The additives and amounts added are shown in Table 5 as Runs 11–24.

TABLE 5

| | | | | | | | | Acrolein (in air) | |
| | | Phenol | | Phosphite | | Oligomer | Polymer | | 6 hrs heating | 10 hrs heating |
| Run | Type | wt % | Type | wt % | YI | IV | YI | (ppm) | (ppm) |
|---|---|---|---|---|---|---|---|---|---|
| 1 | none | | | | 4.7 | | | | |
| 2 | HP-6 | 0.1 | | | 11.5 | | | | |
| 3 | HP-6 | 0.05 | C-1 | 0.05 | 16.9 | | | | |
| 4 | none | | | | 6.0 | 1.24 | 19.8 | 360 | |
| 5 | HP-1 | 0.1 | | | 5.1 | 1.1 | 32.9 | 110 | |
| 6 | HP-1 | 0.05 | C-1 | 0.05 | 8.7 | 0.97 | 29.4 | 30 | |
| 7 | none | | | | 14.1 | 1.03 | 29.6 | 230 | |
| 8 | | | A-1 | 0.1 | | 1.21 | 33.7 | 320 | 500 |
| 9 | HP-1 | 0.1 | | | 27.5 | 1.2 | 23.2 | 30 | |
| 10 | HP-1 | 0.05 | E-1 | 0.05 | 12.6 | 0.89 | 33.2 | 27 | |
| 11 | none | | | | 11.2 | 1.37 | 36.8 | 330 | 480 |
| 12 | | | A-1 | 0.15 | 6.5 | 1.08 | 27.1 | 230 | 380 |
| 13 | | | A-1 | 0.2 | | 0.98 | 24.2 | 410 | 610 |
| 14 | HP-1 | 0.05 | A-1 | 0.15 | 13.9 | 0.92 | 36.7 | 27 | 37 |
| 15 | HP-2 | 0.05 | A-1 | 0.15 | 13.5 | 1.03 | 29.3 | 26 | 34 |
| 16 | HP-5 | 0.05 | A-1 | 0.15 | 18.6 | 1.09 | 58.7 | 15 | |
| 17 | HP-3 | 0.05 | A-1 | 0.15 | 23.8 | 0.54 | 31.7 | 16 | |
| 18 | HP-4 | 0.05 | A-1 | 0.15 | 16.0 | 0.89 | 35.2 | 14 | |
| 19 | HP-7 | 0.05 | A-1 | 0.15 | 7.7 | 0.92 | 29.3 | 15 | |
| 20 | HP-10 | 0.05 | A-1 | 0.15 | 11.4 | 0.75 | 19.3 | 15 | |
| | HP-10 | 0.05 | A-1 | 0.15 | 17.4 | 1.25 | 71.3 | 15 | |
| 21 | HP-8 | 0.063 | A-1 | 0.127 | 26.1 | 0.64 | 49.4 | 17 | |
| 22 | HP-1 | 0.05 | A-1+/E-1 | 0.05/0.05 | 9.1 | 1.1 | 40.0 | 23 | |
| 23 | HP-9 | 0.05 | A-1 | 0.15 | 39.8 | 0.87 | 53.8 | 19 | |
| 24 | HP-1 | 0.05 | | | 24.0 | 1.09 | 47.2 | 46 | 46 |

Wt. % are based on total charge of TPA and PDO to first reaction stage.

TABLE 5-continued

|     |      | Phenol |      | Phosphite | Oligomer |    | Polymer | Acrolein (in air) 6 hrs heating | 10 hrs heating |
|-----|------|--------|------|-----------|----------|----|---------|--------------------------------|----------------|
| Run | Type | wt %   | Type | wt %      | YI       | IV | YI      | (ppm)                          | (ppm)          |

HP-1 = Octadecyl 3-(3,5-di-t-butyl-4-hydroxyphenyl)propionate
HP-2 = Tetrakis (methylene(3-(3,5-d-t-butyl-4-hydroxyphenyl)propionate))-methane
HP-3 = 1,6-Hexamethylene bis(3-(3,5-d-t-butyl-4-hydroxyphenyl)propionate)
HP-4 = Triethyleneglycol bis(3-(3-t-butyl-4-hydroxy-5-methylphenyl)propionate)
HP-5 = 1,2-bis(3-(3,5-d-t-butyl-4-hydroxyphenyl)propionyl)hydrazine
HP-6 = N,N'-hexamethylene bis(3,(3,5-di-t-butyl-4-hydroxyphenyl)propionamide)
HP-7 = Tris [2-[3,5-di-t-butyl-4-hydroxyphenyl)propionyloxy]ethyl]isocyanurate
HP-8 = 1,3,5-tris(4-t-butyl-3-hydroxy-2,6-dimethylbenzyl)-1,3,5-triazine-2,4-6-(1H,3H,5H)-trione
HP-9 = 1,3,5-tris(3,5)di-t-butyl-4-hydroxybenzyl)-1,3,5-triazine-2,4,6-(1H,3H,5H)-trione
HP-10 = 1,3,5-trimethyl-2,4,6-tris(3,5-di-t-butyl-4-hydroxybenzyl)benzene Table 5 shows the effects of the hindered phenols on the formation of acrolein when the polymer is heated in air at 175° C., as measured by headspace GC. In general, the hindered phenols suppressed formation of acrolein much better than did the phosphites. In fact, higher amounts of phosphite appear to increase the amount of acrolein rather than decrease it; e.g., see Runs 8 and 13 compared to 7 and 11, respectively. However, the combination of hindered phenol with phosphite is more effective than hindered phenol alone; see Run 6 compared to Run 5 and Run 14 compared to Run 24.

EXAMPLE 19

Preparation of PTT.

An oil-heated, stainless steel reactor was charged with about 11.5 lbs 1,3-propanediol, about 19.3 terephthalic acid, the indicated amount of hindered phenol, and the indicated amount of organophosphite. The reaction mixture was heated to about 260° C. under 10–60 psi nitrogen, and the aqueous distillate was removed over about 4 hours. To this oligomeric product was added about 9.6 lbs 1,3-propanediol and about 16.1 lbs terephthalic acid, and the reaction was continued under similar conditions for typically less than 3 hours to form an oligomer with an average degree of polymerization of about 4 to 8. Approximately half of the oligomer was transferred to a second reactor. For subsequent batches, 1,3-propanediol (9.6 lbs) and terephthalic acid (16.1 lbs) were added to the oligomer remaining in the first reactor and the oligomerization was repeated. Titanium catalyst [Ti(OBu)$_4$] was added as a solution in PDO/HOAc to the second reactor, the reaction mixture was heated at about 250° C. under less than about 2 mm Hg, and the excess 1,3-propanediol was distilled off over about 1–2 hrs at full vacuum until the desired molecular weight was achieved (i.v. about 0.8). The molten polymer (18–22 lbs) was discharged from the reactor as strands, cooled and pelletized. The carbonyl level (C=O) in the vacuum stage PDO distillate, the polymer color (b*), and the acrolein level (measured by headspace GC on pellets at 175° C. in air after 6 and 10 hrs in ppm based on polymer weight) are shown in Table 6. Hunter b* color was measured by reflectance on the pellets using a Hunter LabScan Spectrocolorimeter. The polymers were advanced to higher molecular weight (i.v. about 1.05) by solid-state polymerization at above about 200° C. under nitrogen flow over about 4–5 hours. The acrolein measured on pellets heated at 175° C. in air for 6 hours is shown. As can be seen from Table 6, the sample with both HP-1 and A-1 (Run 4) generated less acrolein when heated in air than samples with no additives or with only an organophosphite additive.

TABLE 6

|     |            |         | PDO distillate |            |      | Acrolein @ 175° C. in air  |                  |                   |
|-----|------------|---------|----------------|------------|------|----------------------------|------------------|-------------------|
|     |            |         |                |            |      | Pre-SS                     |                  | Post-SS           |
| Run | Additive   | (ppm P) | ppm C=O        | (% change) | b*   | 6 hrs (ppm)                | 10 hrs (ppm)     | 6 hrs (ppm)       |
| 1   | none       |         | 1240           |            | 22.3 |                            |                  |                   |
| 2   | A-1        | 30      | 1000           | (−19)      | 19.5 |                            |                  |                   |
| 3   | A-1        | 50      | 850            | (−31)      | 19.7 | 87                         | 242              | 213               |
| 4   | A-1 + HP-1 | 50      | 860            | (−31)      | 22.1 | 9                          | 16               | 50                |
| 5   | none       |         | 1090           |            | 21.6 |                            |                  |                   |
| 6   | C-1        | 50      | 920            | (−16)      | 19.5 | 61                         | 156              | 160               |
| 7   | A-1 + HP-1 | 30      | 1030           | (−6)       | 24.6 |                            |                  |                   |
| 8   | none       |         | 1270           |            | 21.4 | 50                         | 101              | 113               |
| 9   | E-1        | 50      | 800            | (−37)      | 21.0 | 57                         | 102              | 66                |
| 10  | none       |         | 1010           |            | 22.1 |                            |                  |                   |
| 11  | D-1        | 50      | 1040           | (+3)       | 21.9 | 59                         | 110              | 232               |
| 12  | A-2        | 50      | 920            | (−9)       | 20.9 | 76                         | 167              | 123               |

EXAMPLE 20

Polymerizations were carried out in pilot-scale equipment as described in Example 19 using organophosphite A-1 (at 24 or 48 ppm P) added to the reaction at either the first (pressure) or second (vacuum) step, using HP-1 hindered phenol (at 0.025 or 0.05 wt %) added to the reaction at either the pressure or vacuum step, and using either 40 or 80 ppm (as Ti) titanium tetrabutoxide catalyst. Typically, three to five or more batches were prepared for each set of reaction conditions. The b* color of the pellets from the reactor (at i.v. about 0.8), the carbonyl levels (C=O) in the vacuum stage PDO distillate, the acrolein in the water distillate, the acrolein measured by headspace GC on pellets at 175° C. in air after 6 hrs (ppm based on polymer weight), and the phosphorous content in the PDO distillate are shown in Table 7. The polymers were advanced to higher molecular weight (i.v. about 1.05) by solid-state (SS) polymerization by heating at greater than 200° C. under nitrogen flow for about 4–5 hrs. The acrolein measured by headspace GC on these pellets at 175° C. in air after 10 hrs (ppm based on polymer weight) is also shown in Table 7. (b*, acrolein in water and carbonyl data are averages of 2–3 batches under each set of reaction conditions. Acrolein from pellets in air and phosphorus were measured on a typical batch in each example.)

The phosphite additive reduced acrolein in the water distillate, especially when added at the pressure step. The phenol did not affect the amount of acrolein in the water distillate.

The carbonyl impurities in the PDO distillate were reduced with higher levels of phosphite additive and also with higher levels of phenolic stabilizer, especially when the phenol was added at the pressure step.

The acrolein measured on pellets heated in air at 175° C. for 6 or 10 hours was substantially reduced in each of Runs 3–11 compared to comparative Runs 1 and 2 without additives. Within Runs 3–10, the higher level of phenol added at the pressure step was advantageous. The molecular weights of the solid-state advanced polymers of Runs 3 and 4 did not change substantially (less than about 0.01 i.v. units) during the heat treatment in air over 10 hours, whereas the polymer of Run 1 showed a substantial decrease (about –0.15 i.v. units) after 10 hours.

TABLE 7

Designed Experiments with Organophosphite A-1 and Hindered Phenol HP-1

| Run | Phosphite (ppm) | Phenol wt % | Cat. ppm Ti | Phosphite Addition | Phenol Addition | b* | Cycle Time min. | Water Dist. Acrolein (ppm) | PDO Distillate C=O (ppm) | PDO Distillate P (ppm) | Acrolein 175° C./air 6 hrs[a] (ppm) | Acrolein 175° C./air 10 hrs[b] (ppm) |
|---|---|---|---|---|---|---|---|---|---|---|---|---|
| 1 | none | none | 40 | | | 18.4 | 77 | 910 | 920 | <20 | 189 | |
| 2 | none | none | 40 | | | 16.8 | 72 | 850 | 820 | <25 | 201 | 253 |
| 3 | 24 | .025 | 40 | press | vac | 16.8 | 79 | 870 | 830 | 1040 | 97 | 28 |
| 4 | 24 | .025 | 80 | vac | press | 17.8 | 72 | 1040 | 680 | 1610 | 68 | 15 |
| 5 | 24 | .05 | 40 | vac | press | 20.1 | 81 | 960 | 730 | 1480 | 68 | 14 |
| 6 | 24 | .05 | 80 | press | vac | 17.1 | 68 | 990 | 680 | 1210 | 75 | 15 |
| 7 | 48 | .025 | 40 | vac | vac | 17.0 | 77 | 870 | 780 | 1610 | 63 | 16 |
| 8 | 48 | .025 | 80 | press | press | 17.3 | 67 | 840 | 650 | 2700 | 57 | 17 |
| 9 | 48 | .05 | 40 | press | press | 17.0 | 106 | 800 | 630 | 2600 | 31 | 13 |
| 10 | 48 | .05 | 80 | vac | vac | 16.5 | 71 | 900 | 690 | 2100 | 64 | 13 |
| 11 | 36 | .0375 | 60 | press | press | 17.7 | 64 | 800 | 780 | 2400 | 67 | 16 |

[a]Measured by headspace GC on pellets before solid-state polymerization.
[b]Measured on pellets after solid-state polymerization.

Table 8 summarizes the average responses to the phosphite level, the addition point of the phosphite, the hindered phenol level and the addition point of the phenol.

TABLE 8

Averaged Results for Example 20

| | Phosphite level | | Addition Point | | Phenol level | | Phenol addition | |
|---|---|---|---|---|---|---|---|---|
| | 24 | 48 | press | vac | .025 | .05 | Press | vac |
| Color (b*) | 18.0 | 17.0 | 17.1 | 17.8 | 17.2 | 17.7 | 18.0 | 16.8 |
| Acrolein (ppm) in water distillate | 960 | 850 | 870 | 940 | 900 | 910 | 910 | 910 |
| Carbonyl (as C=O) in PDO distillate (ppm) | 730 | 690 | 700 | 720 | 730 | 680 | 670 | 740 |
| Acrolein (ppm) from pre-SS pellets in air @ 175° C./ 6 hrs. | 77 | 54 | 65 | 66 | 71 | 60 | 56 | 75 |
| Acrolein (ppm) from post-SS pellets in air @ 175° C./ 10 hrs. | 18 | 15 | 18 | 15 | 19 | 14 | 15 | 18 |

The results among Runs 3–10 show that, on average, higher phosphite level reduced color, especially when it was added at the pressure step. Higher phenol increased color, but the color was reduced when the phenolic stabilizer was added at the vacuum step.

I claim:

1. A process for reducing carbonyl byproduct generation in the condensation polymerization of 1,3-propanediol (emphasis supplied) and an aromatic diacid or alkyl ester thereof to produce an aromatic polyester, the process comprising:

adding to a condensation polymerization reaction mixture 1,3-propanediol (emphasis supplied) and an aromatic diacid or alkyl ester thereof:
(i) a hindered phenol of the formula

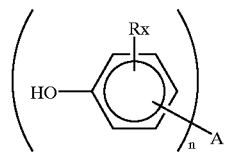

in which each R is independently selected from $C_{1-30}$ alkyl and at least one R is ortho to the phenolic hydroxyl group; x is an integer from 1 to 4; A is a $C_{5-50}$ hydrocarbyl or heterocarbyl group; and n is an integer from 1 to 4; and
(ii) an aromatic organophosphite comprising a trivalent phosphorus group $(ArO)_w P$ in which Ar is an aromatic group and w is an integer from 1 to 3; and
subjecting said reaction mixture to a temperature within the range of about 180 to about 300° C. for a time sufficient to produce a polyester composition having an intrinsic viscosity of at least about 0.8.

2. The process of claim 1 in which the hindered phenol is described by the formula

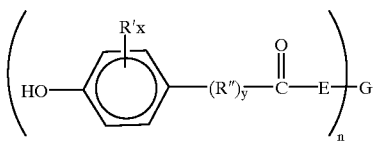

in which R' is $C_{1-12}$ alkyl; R" is —$(CH_2)$— or alkyl-substituted methylene; y is an integer from 1 to 20; E is oxygen or nitrogen; and G is selected from a direct bond, hydrogen and $C_{1-30}$ hydrocarbyl or heterocarbyl.

3. The process of claim 1 in which the hindered phenol is present in said reaction mixture an amount within the range of about 0.0005 to about 5 mmole per mole of diacid.

4. The process of claim 3 in which the aromatic organophosphite is present in said reaction mixture in an amount within the range of about 0.01 to about 0.5 wt %, based on the weight of the reaction mixture.

5. The process of claim 1 in which the aromatic organophosphite is described by the formula

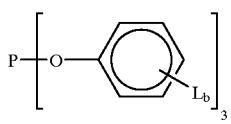

in which each L is selected independently from the group consisting of $C_{1-20}$ hydrocarbyl and heterocarbyl and b is an integer from 1 to 3.

6. The process of claim 1 in which the aromatic organophosphite is described by the formula

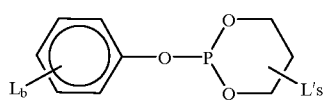

in which each L and each L' is selected independently from $C_{1-20}$ hydrocarbyl and heterocarbyl, b is an integer from 1 to 3, and s is an integer from 0 to 6.

7. The process of claim 1 in which the aromatic organophosphite is described by the formula

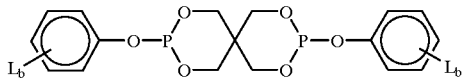

in which each L is selected independently from $C_{1-20}$ hydrocarbyl and heterocarbyl and each b is selected independently from integers from 1 to 3.

8. The process of claim 1 in which the aromatic organophosphite is described by the formula

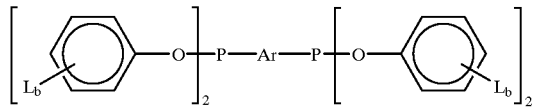

in which Ar is an aromatic linking group, each L is selected independently from $C_{1-20}$ hydrocarbyl and heterocarbyl, and each b is selected from integers from 1 to 3.

9. The process of claim 1 in which the aromatic organophosphite is described the formula

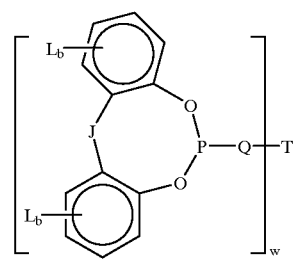

in which each L is selected independently from $C_{1-20}$ hydrocarbyl and heterocarbyl, each b is selected independently from integers from 1 to 3, J is a direct bond or divalent linking group, Q is fluorine or a divalent linking group, w is an integer from 1 to 3, and T is selected from hydrogen and $C_{1-20}$ hydrocarbyl and heterocarbyl.

10. The process of claim 1 in which the hindered phenol is selected from octadecyl 3-(3,5-di-t-butyl-4-hydroxyphenyl) propionate and tetrakis(methylene(3-(3,5-di-t-butyl-4-hydroxyphenyl)propionate))-methane.

11. The process of claim 10 in which the aromatic organophosphite is selected from the group consisting of tris(2,4-di-t-butylphenyl)phosphite, bis(2,4-di-t-butylphenyl)pentaerythritol diphosphite and 2-[[2,4,8,10-tetrakis(1,1-dimethylethyl)dibenzo[d,f][1,3,2]-dioxaphosphepin- 6-yl]oxy]-N,N-bis[2-[[2,4,8,10-tetrakis (1,1-dimethylethyl)dibenzo[d,f][1,3,2]dioxaphosphepin-6-yl]oxy]-ethyl]ethanamine.

12. The process of claim 11 in which the hindered phenol is present in the reaction mixture in an amount within the range of about 0.005 to about 0.5 mmole per mole of the diacid, and the aromatic organophosphite is present in an amount within the range of about 0.05 to about 0.3 wt % based on the weight of the reaction mixture.

13. The process of claim 1 in which the aromatic diacid is selected from the group consisting of terephthalic acid, isophthalic acid, 2,6-naphthalic acid, and mixtures thereof.

14. The process of claim 1 in which the aromatic diacid is a mixture of terephthalic acid and isophthalic acid.

15. The process of claim 1 in which the condensation polymerization reaction mixture further comprises bis(3-hydroxypropyl)ether.

16. The process of claim 1 in which the aromatic diacid is isophthalic acid.

17. The process of claim 1 in which comprises the steps of:
(a) maintaining said polymerization reaction mixture at a temperature within the range of about 230 to about 300° C. under greater than atmospheric pressure for a time sufficient to produce an intermediate reaction product mixture comprising a 1,3-propanediol-based polyester having an intrinsic viscosity within the range of about 0.05 to about 0.25;
(b) adding a condensation polymerization catalyst to said intermediate reaction mixture and maintaining the catalyst-containing intermediate reaction product mixture at a temperature within the range of about 240 to about 300° C. under less than atmospheric pressure for a time sufficient to produce a 1,3-propanediol-based polyester having an intrinsic viscosity of at least about 0.5; and
(c) heating said polyester in the solid state at a temperature greater than about 180° C. for a time sufficient to produce a polyester composition having an intrinsic viscosity of at least about 0.8.

18. The process of claim 17 in which the condensation polymerization catalyst is selected from the group consisting of titanium and tin compounds.

19. The process of claim 17 in which the condensation polymerization catalyst is titanium butoxide.

20. The process of claim 17 in which step (c) is carried out for a time sufficient to produce a polyester composition having an intrinsic viscosity within the range of about 0.95 to about 1.15.

* * * * *